United States Patent
Zhou et al.

(10) Patent No.: US 12,230,970 B2
(45) Date of Patent: Feb. 18, 2025

(54) DIESEL-STORAGE INDEPENDENT MICROGRID AND VIRTUAL DYNAMIC SYNCHRONOUS CONTROL METHOD AND SYSTEM THEREFOR

(71) Applicant: GUANGDONG ZHICHENG CHAMPION GROUP CO., LTD., Guangdong (CN)

(72) Inventors: Leming Zhou, Guangdong (CN); Weilang Yi, Guangdong (CN); Yandong Chen, Guangdong (CN); Shuke Wang, Guangdong (CN); Qi Liu, Guangdong (CN); Jie Zhou, Guangdong (CN); Qingguang Zeng, Guangdong (CN); An Luo, Guangdong (CN)

(73) Assignee: Guangdong Zhicheng Champion Group Co., Ltd., Guangdong (CN)

( * ) Notice: Subject to any disclaimer, the term of this patent is extended or adjusted under 35 U.S.C. 154(b) by 0 days.

(21) Appl. No.: 18/020,372

(22) PCT Filed: Apr. 19, 2022

(86) PCT No.: PCT/CN2022/087562
§ 371 (c)(1),
(2) Date: Feb. 8, 2023

(87) PCT Pub. No.: WO2023/082546
PCT Pub. Date: May 19, 2023

(65) Prior Publication Data
US 2024/0283254 A1 Aug. 22, 2024

(30) Foreign Application Priority Data
Nov. 9, 2021 (CN) .......................... 202111319301.7

(51) Int. Cl.
*H02J 3/44* (2006.01)
*H02J 3/32* (2006.01)
*H02J 3/38* (2006.01)

(52) U.S. Cl.
CPC ................. *H02J 3/44* (2013.01); *H02J 3/32* (2013.01); *H02J 3/381* (2013.01); *H02J 2203/10* (2020.01); *H02J 2300/10* (2020.01)

(58) Field of Classification Search
CPC ...... H02J 3/44; H02J 3/32; H02J 3/381; H02J 2203/10; H02J 2300/10
See application file for complete search history.

(56) References Cited

U.S. PATENT DOCUMENTS

| 11,239,779 | B2 * | 2/2022 | Tuckey | ................... H02P 9/02 |
| 2016/0006338 | A1 * | 1/2016 | Sakimoto | .......... H02M 7/53875 |
| | | | | 363/131 |
| 2021/0175711 | A1 * | 6/2021 | Yoshizawa | ................ H02J 3/26 |

FOREIGN PATENT DOCUMENTS

| CN | 106208159 A | 12/2016 |
| CN | 113315179 A | 8/2021 |
| CN | 113890065 A | 1/2022 |

OTHER PUBLICATIONS

English abstract of CN106208159A.
(Continued)

*Primary Examiner* — Lincoln D Donovan
*Assistant Examiner* — Alex W Lam
(74) *Attorney, Agent, or Firm* — Caesar Rivise, PC (57) ABSTRACT

A diesel-storage independent microgrid and a virtual dynamic synchronous control method and system are described. An adaptive dynamic synchronous torque and pre-synchronous compensation phase angles are introduced into a energy storage converter control system to realize output voltage and power synchronization before and after parallel connection of the system. By compensating the (Continued)

pre-synchronous phase angles, the phase angles of a diesel generator and an energy storage converter are kept consistent before parallel connection, which reduces current impact during the parallel process. By introducing the adaptive dynamic synchronous torque, after the parallel connection of the system, the virtual torque of the energy storage converter can be adaptively and dynamically adjusted according to the current accelerations of the diesel generator and the energy storage converter under the condition that the inertial parameter of a diesel engine is black-boxed.

14 Claims, 2 Drawing Sheets (56) References Cited

OTHER PUBLICATIONS

English abstract of CN113315179A.
English abstract of CN113890065A.
Shi et al., "Research on Virtual Inertia Control Strategy for Energy Storage Converters Based on Frequency Differentiation Scheme", Proceedings of the CSEE, vol. 41, No. 6, pp. 2089-2098, Mar. 20, 2021.
International Search Report for corresponding PCT Application No. PCT/CN2022/087562 dated Jul. 29, 2022.

* cited by examiner

FIG.3 (a) and FIG.3 (b)

FIG.4 (a) and FIG.4 (b)

FIG.5 (a) and FIG.5 (b)

DIESEL-STORAGE INDEPENDENT MICROGRID AND VIRTUAL DYNAMIC SYNCHRONOUS CONTROL METHOD AND SYSTEM THEREFOR

CROSS-REFERENCE TO RELATED APPLICATIONS

This application is a U.S. National Phase App plication of PCT/CN2022/087562, filed Apr. 19, 2022, which claims priority to Chinese Patent Application No. 202111319301.7 filed on Nov. 9, 2021, which is incorporated herein by reference in its entirety.

FIELD OF THE INVENTION

The present invention relates to the fields of island, port, wharf, and ship power supply and control, in particular to a diesel-storage independent microgrid and a virtual dynamic synchronous control method and system therefor.

BACKGROUND OF THE INVENTION

A diesel-storage independent microgrid system has a small power supply scale and weak energy support capability. It requires parallel synchronous output of a diesel engine and an energy storage converter to improve the voltage support capability, so as to meet the power supply requirements of national defense and civil high-power impact special loads. However, due to the inertia of a diesel engine set, when the conventional droop-controlled energy storage converter is used in parallel with the diesel engine to supply power, the power distribution in the dynamic process of the system is unbalanced, which easily causes overcurrent of power electronic equipment. Therefore, in order to match the power supply requirements of this kind of special loads, the energy storage converter must simulate the inertia and damping characteristics of a diesel generator set and work in a VSG state, so as to realize multi-channel synchronous power supply, which is similar to a parallel system of multiple synchronous machines. However, when a VSG simulates the inertia of a diesel generator, the oscillation characteristic of a synchronous motor rotor is inevitably introduced. Therefore, in the parallel system of the diesel engine and multiple distributed power sources with virtual inertia, the active power of the system often oscillates in the case of sudden load change. Although the existing oscillation suppression technology can suppress the oscillation of active power when multiple VSGs are connected in parallel, the virtual inertia introduced in the dynamic process is far greater than the virtual inertia of the system itself in most cases, so that the equivalent inertia coefficients of each VSG is approximately the same, which ensures a consistent transient process to avoid power oscillation of the system. All VSGs work in a virtual synchronous control mode. Parameters such as virtual inertia and damping coefficient are known and adjustable variables, and the control system and parameters can be modified, but this technology is not suitable for diesel-storage independent microgrid systems. Once the diesel engine is developed, the parameters such as inertia coefficient, output impedance, damping coefficient and the control system of the diesel engine cannot be changed. On the other hand, because the inertia of the diesel engine is black-boxed, it is difficult to realize inertia matching of the parallel system. Especially under the operating condition of a high energy pulse load, the power of the system changes frequently, and the energy storage unit working in a voltage source mode is prone to continuous power oscillation with the diesel generator set, causing overcurrent of the converter, and even damage to the converter in severe cases.

Although the dynamic synchronous torque control of a high overload energy conversion power supply provided by the invention patent application CN112271723A can also solve the power oscillation problem caused by the high energy pulse load, this invention uses the difference between the angular speed of a diesel generator and the angular speed of a converter to calculate the dynamic synchronous torque, the dynamic torque coefficient cannot be adjusted adaptively, the dynamic adjustment speed is relatively slow, and for pulsed loads with a short period, the transient output power of the diesel generator and the energy storage converter is likely to be unbalanced, causing low frequency oscillation of the output power of the two.

SUMMARY OF THE INVENTION

In response to the deficiencies of the prior art, the technical problem to be solved by the present invention is to provide a diesel-storage independent microgrid and a virtual dynamic synchronous control method and system therefor, which can adaptively and dynamically adjust the virtual torque of an energy storage converter under the condition that the inertial parameter of a diesel engine is black-boxed.

In order to solve the above technical problem, the technical solution adopted in the present invention is: a method for calculating a dynamic synchronous torque damping coefficient of a diesel-storage independent microgrid, wherein the diesel-storage independent microgrid includes a diesel generator and an energy storage battery; the diesel generator is connected to a power supply bus; the energy storage battery is connected to the power supply bus through an energy storage converter; the power supply bus is connected to a conventional load and a pulsed load; the dynamic synchronous torque damping coefficient $H_{damp}$ is calculated by the following formula:

$$\Box H_{damp} = \begin{cases} H_{damp0} |a_{g2} - a_{g1}| \leq C \\ H_{damp0} + k \dfrac{|\omega_2 - \omega_1|}{\omega_2 - \omega_1}(a_{g2} - a_{g1})|a_{g2} - a_{g1}| > C \end{cases};$$

Herein, $H_{damp0}$ represents a steady-state value of the dynamic synchronous torque damping coefficient, k is an adaptive adjustment factor, and C is a threshold value of the difference between the angular acceleration $a_{g1}$ of the diesel generator and the angular acceleration $a_{g2}$ of the energy storage converter; $\omega1$ and $\omega2$ are respectively the voltage angular frequency of the diesel generator and the voltage angular frequency of the energy storage converter.

By using the method for calculating a dynamic synchronous torque damping coefficient according to the present invention, the synchronous torque coefficient can be dynamically adjusted according to the angular accelerations of the diesel generator set and the energy storage converter, which greatly improves the dynamic response speed in the case of sudden load change.

The calculation formula of the threshold value C of the difference between the angular acceleration $a_{g1}$ of the diesel generator and the angular acceleration $a_{g2}$ of the energy storage converter is:

$$C = |a_{g1\_0} - a_{g2\_0}| = \frac{5\% \, P_{load\_n}}{\omega_n(D_{P1}+D_{p2})}\left(\frac{D_{P1}}{J_1} - \frac{D_{P2}}{J_2}\right) = < \frac{D_{P2}}{2J} \cdot \frac{5\% \, P_{load\_n}}{\omega_n(D_{P1}+D_{p2})};$$

Herein, $P_{load\_n}$ is a rated load power of the diesel-storage independent microgrid, $a_{g1\_0}$ is an initial value of the angular acceleration of the diesel generator, $a_{g2\_0}$ is an initial value of the angular acceleration of the energy storage converter, $J_1$ is an inertia coefficient of the diesel generator, $J_2$ is a virtual inertia coefficient of the energy storage converter, $D_{p1}$ is a damping coefficient of the diesel generator, $D_{p2}$ is a damping coefficient of the energy storage converter, and $\omega_n$ is a rated output angular frequency of the energy storage converter.

By using the method for calculating a threshold value according to the present invention, the dynamic synchronous torque coefficient can be prevented from jumping back and forth due to interference and steady-state slight changes in the angular accelerations of the diesel generator and the energy storage converter, thereby improving the anti-interference ability and stability of the system.

A virtual dynamic synchronous control method for a diesel-storage independent microgrid, wherein the diesel-storage independent microgrid includes a diesel generator and an energy storage battery; the diesel generator is connected to a power supply bus; the energy storage battery is connected to the power supply bus through an energy storage converter; the power supply bus is connected to a conventional load and a pulsed load; the method includes the following steps:

S1, calculating a control angular frequency instruction value $\omega_2$ of the energy storage converter:

$$\frac{P_N}{\omega_n} - \frac{P_{e2}}{\omega_n} = J_2 \frac{d\omega_2}{dt} + D_{p2}(\omega_n - \omega_2) + T_{H2};$$

$$T_{H2} = \int H_{damp}(a_{v2} - a_{g1});$$

where $P_N$ is a rated output power of the energy storage converter, $\omega_n$ is a rated output angular frequency of the energy storage converter, $J_2$ is a virtual inertia coefficient of the energy storage converter, $D_{p2}$ is a damping coefficient of the energy storage converter, $T_{H2}$ is a virtual dynamic synchronous torque of the energy storage converter, $a_{g1}$ is an angular acceleration of the diesel generator, $a_{v2}$ is an angular acceleration of the energy storage converter, $P_{e2}$ is an active power output by the energy storage converter, and the dynamic synchronous torque damping coefficient $H_{damp}$ is obtained according to the above calculation method;

S2, using the following formula to calculate an a phase voltage control signal output by the energy storage converter: $U_{va}*$: $U_{va}* = U_{p2} \sin \theta_2*$; $\theta_2* = \theta_2 + \Delta\varphi_2$; $\theta_2 = \int \omega_2 dt$; where $\theta_2$ is an output voltage control phase angle instruction value of the energy storage converter, $U_{p2}$ is an output voltage instruction peak value of the energy storage converter, $\Delta\varphi_2$ is a pre-synchronous control phase angle compensation value of the energy storage converter, and b and c phase voltage control signals of the energy storage converter lag 120° and 240°, respectively; and S3, performing pulse width modulation (PWM) on an iphase voltage control signal $U_{vi}*$ of the energy storage converter to obtain a drive signal for a switch tube in the energy storage converter, where i represents three phases a, b, and c, respectively.

In the present invention, an adaptive dynamic synchronous torque is introduced into the control system of the energy storage converter, and the dynamic torque is adjusted according to the angular accelerations of the diesel generator set and the energy storage converter, which can quickly reduce the angular accelerations and angular velocities of the diesel generator and the energy storage converter, suppress system power oscillation caused by the impact load, and realize synchronous power supply of the two. Meanwhile, the use of the adaptive dynamic synchronous torque coefficient further improves the dynamic response speed of power oscillation suppression of the system. The calculation formula of the pre-synchronous control phase angle compensation value $\Delta\varphi_2$ of the energy storage converter is:

$$\Delta\varphi_2 = SW \cdot \frac{k_c}{s}(\varphi_2 - \varphi_1);$$

Herein, $k_c$ is an integral control parameter, $\varphi_1$ and $\varphi_2$ represent a voltage phase angle of the diesel generator and a voltage phase angle of the energy storage converter respectively, SW is a switch, the value of SW is 1 before the diesel generator and the energy storage converter are connected in parallel, and the value of SW is 0 after the diesel generator and the energy storage converter are connected in parallel.

By using the method for calculating a pre-synchronous phase angle compensation value according to the present invention, the same frequency, same amplitude and same phase of the three-phase voltage can be quickly realized before the diesel generator and the energy storage converter are connected in parallel, which greatly reduces current impact by connecting the diesel generator and the energy storage converter in parallel.

The calculation formulas of the angular acceleration $a_{g1}$ of the diesel generator and the angular acceleration $a_{g2}$ of the energy storage converter are:

$$\begin{cases} a_{g1} = \frac{\omega_1(n+1) - \omega_1(n)}{T_s} \\ a_{g2} = \frac{T_{n2} - T_{D2} - T_{e2} - T_{H2}}{J_2} = \frac{T_2}{J_2} \end{cases};$$

Herein, $\omega_1(n+1)$ and $\omega_1(n)$ are respectively (n+1)-th and n-th angular velocity sampling values of the diesel generator set, $T_s$ is an angular velocity sampling period of the diesel generator set, $T_{n2}$ is a rated torque of the energy storage converter, $T_{D2}$ is a damping torque of the energy storage converter, $T_{e2}$ is an electromagnetic torque of the energy storage converter, $T_2$ is a resultant torque of the energy storage converter, and $J_2$ is the virtual inertia coefficient of the energy storage converter.

By using the above method for calculating angular accelerations, reference values can be provided for the calculation of a virtual dynamic synchronous torque and a virtual dynamic synchronous torque coefficient. The angular accelerations can be calculated in two sampling periods, which greatly improves the calculation efficiency.

As an inventive concept, the present invention further provides a power supply control method for a diesel-storage independent microgrid, the method including:

before a diesel generator and an energy storage converter are connected in parallel, compensating pre-synchronous phase angles to keep the phase angles of the diesel generator and the energy storage converter consistent, wherein a compensation value for the pre-synchronous phase angles is:

$$\Delta\varphi_2 = SW \cdot \frac{k_c}{s}(\varphi_2 - \varphi_1),$$

where $k_c$ is an integral control parameter, SW is a switch, the value of SW is 1 before the diesel generator and the energy storage converter are connected in parallel, and the value of SW is 0 after the diesel generator and the energy storage converter are connected in parallel; and after the diesel generator and the energy storage converter are connected in parallel, controlling the energy storage converter by using the virtual dynamic synchronous control method of the present invention.

By compensating synchronous phase angles, the diesel generator and the energy storage converter keep the same frequency, same phase and same amplitude before parallel connection, which reduces current impact in the parallel connection process and realizes synchronous power supply of the diesel generator and the energy storage converter.

As an inventive concept, the present invention further provides a virtual dynamic synchronous control system for a diesel-storage independent microgrid, including computer equipment, wherein the computer equipment is configured or programmed to execute the steps of the method of the present invention.

As an inventive concept, the present invention further provides a diesel-storage independent microgrid, including the virtual dynamic synchronous control system of the present invention.

Compared with the prior art, the present invention has the following beneficial effects: the present invention can adaptively and dynamically adjust the virtual torque of the energy storage converter under the condition that the inertial parameter of the diesel generator is black-boxed, correct the dynamic synchronization damping coefficient according to the accelerations of the diesel generator and the energy storage converter, and adapt to the angular acceleration of the energy storage converter, thereby improving the dynamic performance of the diesel generator and the energy storage converter and reducing the system power oscillation amplitude. The present invention adaptively adjusts the dynamic synchronous torque coefficient of the energy storage converter by calculating the difference between the angular accelerations of the diesel generator and the energy storage converter, and determining the relationship between the angular accelerations and angular velocities of the two (the diesel generator and the energy storage converter), thereby directly and dynamically adjusting the angular accelerations of the diesel generator and the energy storage converter, realizing dynamic adjustment of the diesel generator and the energy storage converter faster, improving the rapid response capability of the diesel-storage independent microgrid system to pulsed loads, and realizing synchronous power supply of the diesel generator and the energy storage converter.

DETAILED DESCRIPTION OF THE EMBODIMENTS

Figure 1:
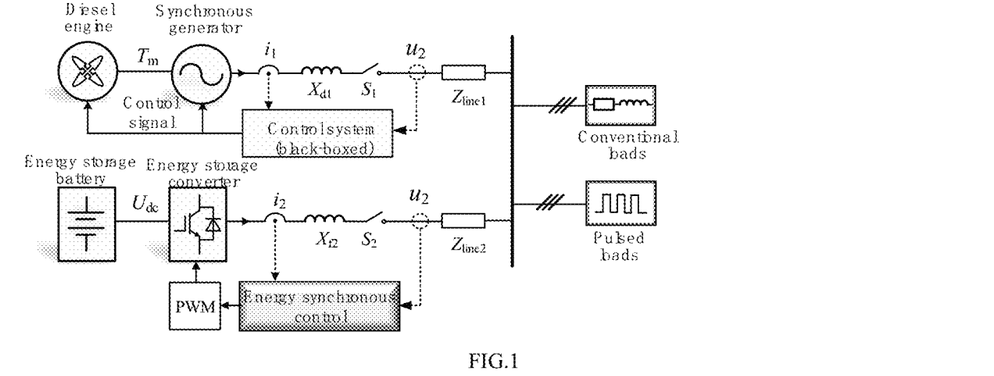
FIG. 1 shows a diesel-storage independent microgrid system according to Embodiment 1 of the present invention.

FIG. 1 shows a diesel-storage independent microgrid system according to Embodiment 1 of the present invention. A diesel generator and an energy storage converter are connected in parallel to supply power to conventional loads and pulsed loads (the pulsed loads refer to the ones whose output power is not fixed and is typically pulsed, such as phase-controlled radar; the conventional loads refer to general loads, such as resistors, inductors and nonlinear loads, and their power is relatively stable). The energy storage converter is subjected to pre-synchronous control before parallel connection and virtual dynamic synchronous control after parallel connection. On the one hand, the impact in the parallel process can be reduced by the pre-synchronous control. On the other hand, the virtual torque of the energy storage converter can be dynamically adjusted under the condition that the inertial parameter and control parameter of the diesel generator are black-boxed, the difference between the angular accelerations of the diesel engine and the energy storage converter can be reduced, the system power oscillation caused by impact loads can be suppressed, and synchronous power supply of the two can be realized.

As shown in FIG. 1, the diesel generator includes a diesel engine and a synchronous generator, which are connected in series. $i_1$ and $i_2$ are respectively output current of the diesel generator and the energy storage converter when connected to the grid, $u_1$ and $u_2$ are respectively output voltages of the diesel generator and the energy storage converter, $Z_{line1}$ and $Z_{line2}$ are line impedances of the diesel generator and the energy storage converter, and $X_{d1}$ and $X_{f2}$ are respectively output inductances of the diesel generator and the energy storage converter.

Figure 2:
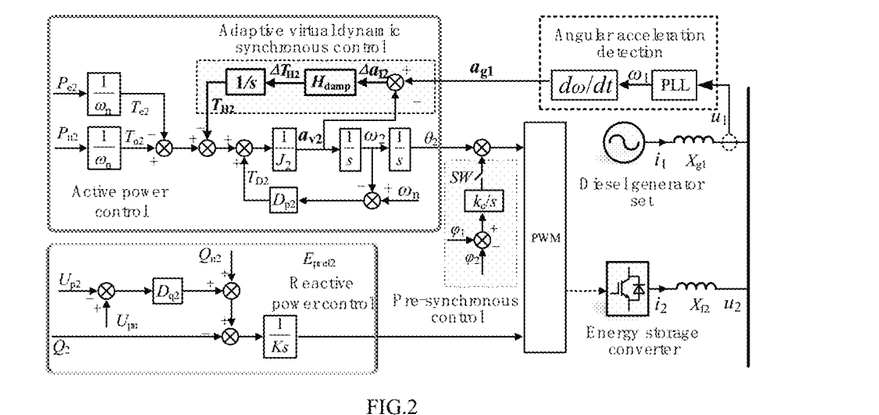
FIG. 2 shows an energy synchronous control method for a diesel-storage independent microgrid according to Embodiment 2 of the present invention.

FIG. 2 shows an energy synchronous control method according to Embodiment 2 of the present invention, which mainly includes pre-synchronous control and virtual dynamic synchronous control. By compensating pre-synchronous phase angles, the phase angles of the diesel generator and the energy storage converter are kept consistent before parallel connection, which reduces impact on the system in the parallel connection process. On the other hand, an adaptive dynamic synchronous torque is introduced in the active power control link of virtual synchronous control, and the angular frequency and acceleration of the energy storage converter are dynamically and adaptively adjusted to reduce the difference between the angular accelerations of the diesel generator and the energy storage converter, so that the output voltage frequencies of the two are basically the same in the dynamic process, thereby suppressing system power oscillation.

The introduced pre-synchronous phase angle compensation value is:

$$\Delta\varphi_2 = SW \cdot \frac{k_c}{s}(\varphi_2 - \varphi_1)$$

Herein, $k_c$ is an integral control parameter, SW is a switch, the value of SW is 1 before parallel connection, and the value of SW is 0 after parallel connection.

The introduced dynamic synchronous torque expression is:

$$T_{H2} = \int H_{damp}(a_{g2} - a_{g1})$$

The adaptive dynamic synchronous torque damping coefficient $H_{damp}$ is as follows:

$$H_{damp} = \begin{cases} H_{damp0} & (|a_{g2} - a_{g1}| \le C) \\ H_{damp0} + k\frac{|\omega_2 - \omega_1|}{\omega_2 - \omega_1}(a_{g2} - a_{g1}) & (|a_{g2} - a_{g1}| > C) \end{cases}$$

Herein, $H_{damp0}$ represents a steady-state value of the dynamic synchronous torque damping coefficient $H_{damp}$, k is an adaptive adjustment factor, C is a threshold value of the difference between the angular acceleration $a_{g1}$ of the diesel generator and the angular acceleration $a_{g2}$ of the energy storage converter, and the expression of C is as follows:

$$C = |a_{g1\_0} - a_{g2\_0}| = \frac{5\% \, P_{load\_n}}{\omega_n(D_{P1} + D_{p2})}\left(\frac{D_{P1}}{J_1} - \frac{D_{P2}}{J_2}\right) =< \frac{D_{P2}}{2J_2} \cdot \frac{5\% \, P_{load\_n}}{\omega_n(D_{P1} + D_{p2})}$$

Herein, $P_{load\_n}$ is a rated load power of the diesel-storage independent microgrid, $a_{g1\_0}$ is an initial value of the angular acceleration of the diesel generator, $a_{v2\_0}$ is an initial value of the angular acceleration of the energy storage converter, $J_1$ is an inertia coefficient of the diesel generator, and $D_{p1}$ is a damping coefficient of the diesel generator.

The angular acceleration $a_{g1}$ of the diesel generator and the angular acceleration $a_{g2}$ of the energy storage converter can be obtained according to the following formulas:

$$\begin{cases} a_{g1} = \frac{\omega_1(n+1) - \omega_1(n)}{T_s} \\ a_{g2} = \frac{T_{n2} - T_{D2} - T_{e2} - T_{H2}}{J_2} = \frac{T_2}{J_2} \end{cases}$$

After the adaptive dynamic synchronous torque is introduced, the active power control expression of the energy storage converter is:

$$\frac{P_N}{\omega_n} - \frac{P_{e2}}{\omega_n} = J_2\frac{d\omega_2}{dt} + D_{p2}(\omega_n - \omega_2) + T_{H2}$$

The reactive power control expression of the energy storage converter is as follows:

$$Q_n - Q_{e2} = D_{q2}(U_{pn} - U_p)$$

Figure 3:
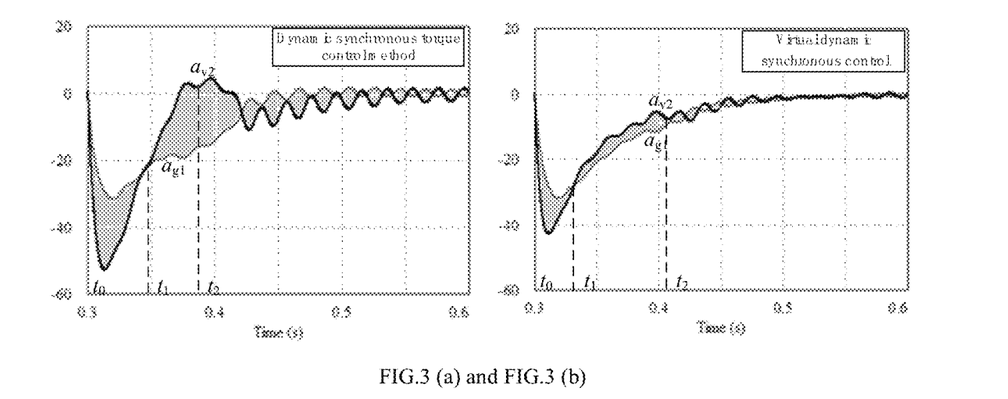
FIG. 3(a) shows an acceleration area under dynamic synchronous torque control in the invention patent application CN112271723A.
FIG. 3(b) shows an acceleration area under adaptive dynamic synchronous torque control.

FIG. 3(a) and FIG. 3(b) show angular acceleration change curves of the diesel generator and the energy storage converter when the load suddenly changes according to the embodiment of the present invention, where FIG. 3(a) shows an acceleration area under dynamic synchronous torque control in the invention CN112271723A, and FIG. 3(b) shows an acceleration area under adaptive dynamic synchronous torque control.

As shown in FIG. 3(a), under the dynamic synchronous torque control, the system can be analyzed in two stages $t_0 \sim t_1$ and $t_1 \sim t_2$. At $t_0$, the load suddenly increases, and the angular acceleration of the system begins to change; at $t_1$, the angular accelerations of the diesel generator set and the energy storage converter are equal; and at $t_2$, the angular frequencies of the diesel generator and the energy storage converter are equal. The specific analysis is as follows:

(i) $t_0 \sim t_1$: because the inertia of the energy storage converter is small, after the load is added, the absolute value $|a_{v2}|$ of the angular acceleration of the energy storage converter is greater than the absolute value $|a_{g1}|$ of the angular acceleration of the diesel generator, and the angular frequencies of the two begin to decrease from rated values. Because of the adjustment effect of the droop characteristic (damping torque), the angular accelerations of the two continue to increase and are equal at $t_1$, and the difference between the angular frequencies reaches the maximum. However, because the angular frequency of the energy storage converter decreases faster, the damping torque $T_{D2}$ is adjusted more strongly, so the angular acceleration of the energy storage converter changes faster.

(ii) At $t_1 \sim t_2$, the angular acceleration of the energy storage converter exceeds the angular acceleration of the diesel generator, the difference between the angular frequencies of the two begins to decrease, and the angular frequencies of the two are equal at $t_2$. At this time, the system power oscillation reaches the maximum.

As shown in FIG. 3(b), using the dynamic synchronous control method of the present invention, the acceleration change can also be analyzed in two stages $t_0 \sim t_1$ and $t_1 \sim t_2$ as follows:

(i) $t_0 \sim t_1$: the angular acceleration $a_{g1}$ of the diesel generator is greater than the angular acceleration $a_{v2}$ of the energy storage converter, the introduced dynamic torque $T_{H2}$ is negative, and the angular acceleration of the energy storage converter will further increase, thereby reducing the angular accelerations of the energy storage converter and the diesel generator set, reducing the acceleration area and suppressing the power oscillation.

(ii) $t_1 \sim t_2$: because the angular frequency $\omega_1$ of the diesel generator is still smaller than the angular frequency $\omega_2$ of the energy storage converter, and the introduced dynamic torque $T_{H2}$ is still negative, the angular frequencies of the diesel generator set and the energy storage converter (that is, the acceleration area) are further reduced, thereby suppressing the system power oscillation.

Figure 4:
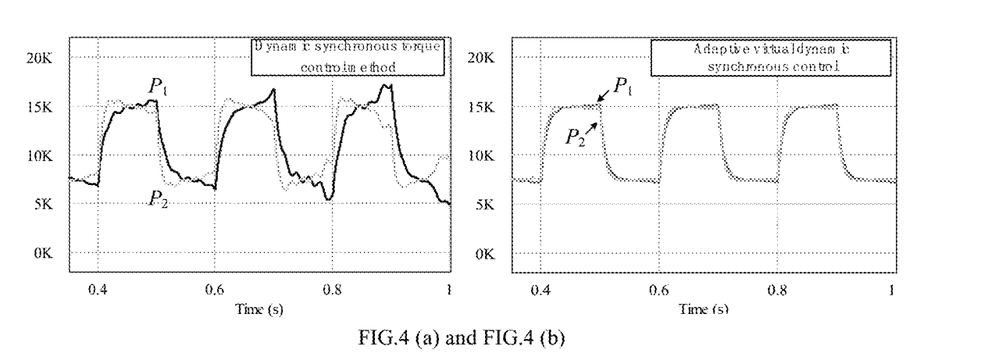
FIG. 4(a) shows a system output power under dynamic synchronous torque control in the invention patent application CN112271723A.
FIG. 4(b) shows a system output power under adaptive virtual dynamic synchronous control.

FIG. 4(a) and FIG. 4(b) show simulations of the output power of the diesel generator and the energy storage converter under the pulsed load in an example of the present invention, where FIG. 4(a) shows a system output power under dynamic synchronous torque control in the invention patent application CN112271723A, and FIG. 4(b) shows a system output power under adaptive virtual dynamic synchronous control. In FIG. 4(a) and FIG. 4(b), the pulse width of the pulsed load is 200 ms, the total peak power of the load is twice the rated power of the diesel generator, $P_1$ is the output power of the diesel generator, and $P_2$ is the output power of the energy storage converter. Apparently, when the dynamic synchronous torque control in the invention patent application CN112271723A is used and the system faces the pulsed load, the output power of the system oscillate greatly and is difficult to reach a stable state, and the output power of the diesel generator and the energy storage converter is difficult to divide equally. When the adaptive virtual dynamic synchronous control method of the present invention is used, the oscillation power of the system is better suppressed, the dynamic performance and steady-state performance of the system are improved, and the steady-state output power can be well divided equally.

Figure 5:
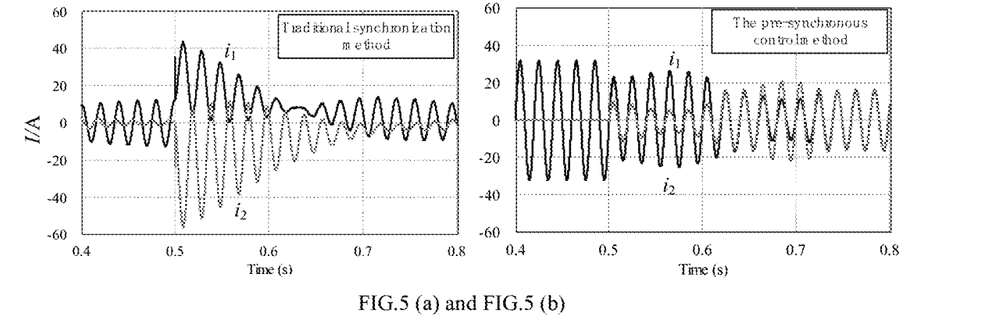
FIG. 5(a) shows output current of a diesel generator and an energy storage converter using a traditional synchronization method.
FIG. 5(b) shows output current of a diesel generator and an energy storage converter using a pre-synchronous control method of the present invention.

FIG. 5(a) and FIG. 5(b) are comparison diagrams of current output waveforms of a traditional synchronous control method and a parallel synchronous system with an energy storage converter in an example of the present invention, where FIG. 5(a) shows output current of a diesel generator and an energy storage converter using the traditional synchronization method, and FIG. 5(b) shows output current of a diesel generator and an energy storage converter using the pre-synchronous control method of the present invention. In FIG. 5(a) and FIG. 5(b), $i_1$ and $i_2$ are respectively the output current of the diesel generator and the energy storage converter when connected to the grid. Apparently, the grid-connected current using the traditional synchronous method has a large impact, which easily causes instability of the system. However, by using the pre-synchronous control method of the present invention, the grid-connected current almost has no impact, and the system can be smoothly connected to the grid.

The invention claimed is:

1. A method for calculating a dynamic synchronous torque damping coefficient of a diesel-storage independent microgrid, wherein the diesel-storage independent microgrid comprises a diesel generator and an energy storage battery; the diesel generator is connected to a power supply bus; the energy storage battery is connected to the power supply bus through an energy storage converter; the power supply bus is connected to a conventional load and a pulsed load; the dynamic synchronous torque damping coefficient $H_{damp}$ is calculated by the following formula:

$$H_{damp} = \begin{cases} H_{damp0} & (|a_{g2} - a_{g1}| \leq C) \\ H_{damp0} + k\frac{|\omega_2 - \omega_1|}{\omega_2 - \omega_1}(a_{g2} - a_{g1}) & (|a_{g2} - a_{g1}| > C) \end{cases};$$

wherein $H_{damp0}$ represents a steady-state value of the dynamic synchronous torque damping coefficient, k is an adaptive adjustment factor, and C is a threshold value of the difference between the angular acceleration $a_{g1}$ of the diesel generator and the angular acceleration $a_{g2}$ of the energy storage converter; $\omega_1$ and $\omega_2$ are respectively the voltage angular frequency of the diesel generator and the voltage angular frequency of the energy storage converter.

2. The method for calculating a dynamic synchronous torque damping coefficient of a diesel-storage independent microgrid according to claim 1, wherein the calculation formula of the threshold value C of the difference between the angular acceleration $a_{g1}$ of the diesel generator and the angular acceleration $a_{g2}$ of the energy storage converter is:

$$C = |a_{g1\_0} - a_{g2\_0}| = \frac{5\% P_{load\_n}}{\omega_n(D_{P1} + D_{p2})}\left(\frac{D_{P1}}{J_1} - \frac{D_{P2}}{J_2}\right) = < \frac{D_{P2}}{2J} \cdot \frac{5\% P_{load\_n}}{\omega_n(D_{P1} + D_{p2})};$$

wherein $P_{load\_n}$ is a rated load power of the diesel-storage independent microgrid, $a_{g1\_0}$ is an initial value of the angular acceleration of the diesel generator, $a_{g2\_0}$ is an initial value of the angular acceleration of the energy storage converter, $J_1$ is an inertia coefficient of the diesel generator, $J_2$ is a virtual inertia coefficient of the energy storage converter, $D_{p1}$ is a damping coefficient of the diesel generator, $D_{p2}$ is a damping coefficient of the energy storage converter, and $\omega_n$ is a rated output angular frequency of the energy storage converter.

3. A virtual dynamic synchronous control method for a diesel-storage independent microgrid, wherein the diesel-storage independent microgrid comprises a diesel generator and an energy storage battery; the diesel generator is connected to a power supply bus; the energy storage battery is connected to the power supply bus through an energy storage converter; the power supply bus is connected to a conventional load and a pulsed load; the method comprises the following steps:

S1, calculating a control angular frequency instruction value $\omega_2$ of the energy storage converter:

$$\frac{P_N}{\omega_n} - \frac{P_{e2}}{\omega_n} = J_2\frac{d\omega_2}{dt} + D_{p2}(\omega_n - \omega_2) + T_{H2};$$

$$T_{H2} = \int H_{damp}(a_{v2} - a_{g1});$$

wherein $P_N$ is a rated output power of the energy storage converter, $\omega_n$ is a rated output angular frequency of the energy storage converter, $J_2$ is a virtual inertia coefficient of the energy storage converter, $D_{p2}$ is a damping coefficient of the energy storage converter, $T_{H2}$ is a virtual dynamic synchronous torque of the energy storage converter, $a_{g1}$ is an angular acceleration of the diesel generator, $a_{v2}$ is an angular acceleration of the energy storage converter, $P_{e2}$ is an active power output by the energy storage converter, and the dynamic synchronous torque damping coefficient $H_{damp}$ is obtained according to the method for calculation of claim 2;

S2, using the following formula to calculate an a phase voltage control signal output by the energy storage converter: $U_{va}*:U_{va}*=U_{p2}$ sin $\theta_2*$; $\theta_2*=\theta_2+\Delta\varphi_2$; $\theta_2=\int\omega_2 dt$; wherein $\theta_2$ is an output voltage control phase angle instruction value of the energy storage converter, $U_{p2}$ is an output voltage instruction peak value of the energy storage converter, $\Delta\varphi_2$ is a pre-synchronous control phase angle compensation value of the energy storage converter, and b and c phase voltage control signals of the energy storage converter lag 120° and 240° respectively; and S3, performing pulse width modulation (PWM) on an iphase voltage control signal $U_{vi}^*$ of the energy storage converter to obtain a drive signal for a switch tube in the energy storage converter, where i=a, b, c.

4. The virtual dynamic synchronous control method for a diesel-storage independent microgrid according to claim 3, wherein the calculation formula of the pre-synchronous control phase angle compensation value $\Delta_{\varphi 2}$ of the energy storage converter is:

$$\Delta\varphi_2 = SW \cdot \frac{k_c}{s}(\varphi_2 - \varphi_1);$$

wherein $k_c$ is an integral control parameter, $\varphi_1$ and $\varphi_2$ represent a voltage phase angle of the diesel generator and a voltage phase angle of the energy storage converter respectively, SW is a switch, the value of SW is 1 before the diesel generator and the energy storage converter are connected in parallel, and the value of SW is 0 after the diesel generator and the energy storage converter are connected in parallel.

5. The virtual dynamic synchronous control method for a diesel-storage independent microgrid according to claim 4, wherein the calculation formulas of the angular acceleration $a_{g1}$ of the diesel generator and the angular acceleration $a_{g2}$ of the energy storage converter are respectively:

$$\begin{cases} a_{g1} = \dfrac{\omega_1(n+1) - \omega_1(n)}{T_s} \\ a_{g2} = \dfrac{T_{n2} - T_{D2} - T_{e2} - T_{H2}}{J_2} = \dfrac{T_2}{J_2} \end{cases};$$

wherein $\omega_1(n+1)$ and $\omega_1(n)$ are respectively (n+1)-th and n-th angular velocity sampling values of the diesel generator set, $T_s$ is an angular velocity sampling period of the diesel generator set, $T_{n2}$ is a rated torque of the energy storage converter, $T_{D2}$ is a damping torque of the energy storage converter, $T_{e2}$ is an electromagnetic torque of the energy storage converter, $T_2$ is a resultant torque of the energy storage converter, and $J_2$ is the virtual inertia coefficient of the energy storage converter.

6. A power supply control method for a diesel-storage independent microgrid, wherein the diesel-storage independent microgrid comprises a diesel generator and an energy storage battery; the diesel generator is connected to a power supply bus; the energy storage battery is connected to the power supply bus through an energy storage converter; the power supply bus is connected to a conventional load and a pulsed load; the method comprises:

before a diesel generator and an energy storage converter are connected in parallel, compensating pre-synchronous phase angles to keep the phase angles of the diesel generator and the energy storage converter consistent, wherein a compensation value for the pre-synchronous phase angles is:

$$\Delta\varphi_2 = SW \cdot \frac{k_C}{s}(\varphi_2 - \varphi_1);$$

where $k_e$ is an integral control parameter, SW is a switch, the value of SW is 1 before the diesel generator and the energy storage converter are connected in parallel, the value of SW is 0 after the diesel generator and the energy storage converter are connected in parallel, and $\varphi_1$ and $\varphi_2$ represent a voltage phase angle of the diesel generator and a voltage phase angle of the energy storage converter respectively; and after the diesel generator and the energy storage converter are connected in parallel, controlling the energy storage converter by using the virtual dynamic synchronous control method according to claim 5.

7. A virtual dynamic synchronous control system for a diesel-storage independent microgrid, comprising computer equipment, wherein the computer equipment is configured or programmed to execute the steps of the method according to claim 6.

8. A diesel-storage independent microgrid, comprising the virtual dynamic synchronous control system according to claim 7.

9. A virtual dynamic synchronous control method for a diesel-storage independent microgrid, wherein the diesel-storage independent microgrid comprises a diesel generator and an energy storage battery; the diesel generator is connected to a power supply bus; the energy storage battery is connected to the power supply bus through an energy storage converter; the power supply bus is connected to a conventional load and a pulsed load; the method comprises the following steps:

S1, calculating a control angular frequency instruction value $\omega_2$ of the energy storage converter:

$$\frac{P_N}{\omega_n} - \frac{P_{e2}}{\omega_n} = J_2 \frac{d\omega_2}{dt} + D_{p2}(\omega_n - \omega_2) + T_{H2};$$

$$T_{H2} = \int H_{damp}(a_{v2} - a_{g1});$$

wherein $P_N$ is a rated output power of the energy storage converter, $\omega_n$ is a rated output angular frequency of the energy storage converter, $J_2$ is a virtual inertia coefficient of the energy storage converter, $D_{p2}$ is a damping coefficient of the energy storage converter, $T_{H2}$ is a virtual dynamic synchronous torque of the energy storage converter, $a_{g1}$ is an angular acceleration of the diesel generator, $a_{v2}$ is an angular acceleration of the energy storage converter, $P_{e2}$ is an active power output by the energy storage converter, and the dynamic synchronous torque damping coefficient $H_{damp}$ is obtained according to the method of calculation of claim 1:

S2, using the following formula to calculate an a phase voltage control signal output by the energy storage converter: $U_{va}^*:U_{va}^*=U_{p2}$ sin $\theta_2^*$; $\theta_2^*=\theta_2+\Delta\varphi_2$; $\theta_2=\int\omega_2 dt$; wherein $\theta_2$ is an output voltage control phase angle instruction value of the energy storage converter, $U_{p2}$ is an output voltage instruction peak value of the energy storage converter, $U\varphi_2$ is a pre-synchronous control phase angle compensation value of the energy storage converter, and b and c phase voltage control signals of the energy storage converter lag 120° and 240° respectively; and S3, performing pulse width modulation (PWM) on an iphase voltage control signal $U_{vi}^*$ of the energy storage converter to obtain a drive signal for a switch tube in the energy storage converter, where i=a, b, c.

10. The virtual dynamic synchronous control method for a diesel-storage independent microgrid according to claim 9, wherein the calculation formula of the pre-synchronous control phase angle compensation value $\Delta_{\varphi 2}$ of the energy storage converter is:

$$\Delta \varphi_2 = SW \cdot \frac{k_c}{s}(\varphi_2 - \varphi_1),$$

wherein $k_e$ is an integral control parameter, $\varphi_1$ and $\varphi_2$ represent a voltage phase angle of the diesel generator and a voltage phase angle of the energy storage converter respectively, SW is a switch, the value of SW is 1 before the diesel generator and the energy storage converter are connected in parallel, and the value of SW is 0 after the diesel generator and the energy storage converter are connected in parallel.

11. The virtual dynamic synchronous control method for a diesel-storage independent microgrid according to claim 9, wherein the calculation formulas of the angular acceleration $a_{g1}$ of the diesel generator and the angular acceleration $a_{g2}$ of the energy storage converter are respectively:

$$\begin{cases} a_{g1} = \dfrac{\omega_1(n+1) - \omega_1(n)}{T_s} \\ a_{g2} = \dfrac{T_{n2} - T_{D2} - T_{e2} - T_{H2}}{J_2} = \dfrac{T_2}{J_2} \end{cases};$$

wherein $\omega_1(n+1)$ and $\omega_1(n)$ are respectively (n+1)-th and n-th angular velocity sampling values of the diesel generator set, $T_s$ is an angular velocity sampling period of the diesel generator set, $T_{n2}$ is a rated torque of the energy storage converter, $T_{D2}$ is a damping torque of the energy storage converter, $T_{e2}$ is an electromagnetic torque of the energy storage converter, $T_2$ is a resultant torque of the energy storage converter, and $J_2$ is the virtual inertia coefficient of the energy storage converter.

12. A power supply control method for a diesel-storage independent microgrid, wherein the diesel-storage independent microgrid comprises a diesel generator and an energy storage battery; the diesel generator is connected to a power supply bus; the energy storage battery is connected to the power supply bus through an energy storage converter; the power supply bus is connected to a conventional load and a pulsed load; the method comprises:

before a diesel generator and an energy storage converter are connected in parallel, compensating pre-synchronous phase angles to keep the phase angles of the diesel generator and the energy storage converter consistent, wherein a compensation value for the pre-synchronous phase angles is: $\Delta\varphi_2 = SW \cdot k_c/s(\varphi_2 - \varphi_1)$, where $k_c$ is an integral control parameter, SW is a switch, the value of SW is 1 before the diesel generator and the energy storage converter are connected in parallel, the value of SW is 0 after the diesel generator and the energy storage converter are connected in parallel, and $\varphi_1$ and $\varphi_2$ represent a voltage phase angle of the diesel generator and a voltage phase angle of the energy storage converter respectively; and after the diesel generator and the energy storage converter are connected in parallel, controlling the energy storage converter by using the virtual dynamic synchronous control method according to claim 9.

13. A virtual dynamic synchronous control system for a diesel-storage independent microgrid, comprising computer equipment, wherein the computer equipment is configured or programmed to execute the steps of the method according to claim 9.

14. A diesel-storage independent microgrid, comprising the virtual dynamic synchronous control system according to claim 13.

* * * * *